United States Patent [19]
Gaysert

[11] 3,899,303
[45] Aug. 12, 1975

[54] APPARATUS FOR THE CATALYTIC PURIFICATION OF EXHAUST GASES OF INTERNAL COMBUSTION ENGINES

[75] Inventor: Gerhard Gaysert, Berkheim, Germany

[73] Assignee: J. Eberspacher, Germany

[22] Filed: Mar. 5, 1973

[21] Appl. No.: 337,947

[30] Foreign Application Priority Data
May 5, 1972  Germany............................. 2221970

[52] U.S. Cl..................... 23/288 F; 60/298; 60/308
[51] Int. Cl............................ F01n 3/10; F01n 3/14
[58] Field of Search............ 23/288 F; 60/298, 308, 60/301, 299

[56] References Cited
UNITED STATES PATENTS

| | | | |
|---|---|---|---|
| 1,789,812 | 1/1931 | Frazer............................... | 23/288 F |
| 3,041,149 | 6/1962 | Houdry............................. | 23/288 F |
| 3,189,418 | 6/1965 | Gary................................. | 23/288 F |
| 3,220,179 | 11/1965 | Bloomfield..................... | 23/288 F X |

*Primary Examiner*—Joseph Scovronek
*Assistant Examiner*—Michael S. Marcus
*Attorney, Agent, or Firm*—McGlew and Tuttle

[57] ABSTRACT

An apparatus for purifying exhaust gases of internal combustion engines comprises a housing which has an intermediate chamber which is filled with catalytic material and a chamber on each side thereof which communicate with the catalytic chamber through perforated walls. The intermediate catalytic chamber connects to a central dome-like extension providing a filling opening for additional catalytic material. An exhaust gas conduit connects into the chamber on one side of the catalytic material chamber and terminates at the inlet to an inspiration tube having a narrow throat inlet at the discharge of the exhaust conduit within the housing and which has a diverging nozzle portion or diffusor section which discharges into the other chamber. The housing includes means for deflecting the exhaust gases backwardly through the catalytic material of the catalytic material chamber for flow subsequently out through an exhaust connection. Supplemental air is introduced into the apparatus preferably between a double wall formation of the housing so that the air is preheated and then delivered to a location for flow through the inlet of the inspiration tube under the induced flow conditions which are set up by the discharge of the exhaust gases into the inlet.

5 Claims, 2 Drawing Figures

APPARATUS FOR THE CATALYTIC PURIFICATION OF EXHAUST GASES OF INTERNAL COMBUSTION ENGINES

BACKGROUND OF THE INVENTION

1. Field of the Invention

This invention relates in general to the construction of devices for the catalytic purification of exhaust gases and, in particular, to a new and useful apparatus for purifying exhaust gases which includes an arrangement for deflecting the exhaust gas flow backwardly through a catalytic chamber having catalytic material after it is first passed into the inlet of an inspiration tube which is also connected at its inlet to a source of additional air which is induced to flow with the exhaust gases.

2. Description of the Prior Art

The present invention is particularly directed to catalytic purification devices for exhaust gases of internal combustion engines. Presently, there is a great need for devices to purify exhaust gases of internal combustion engines and it is very difficult to obtain an economical one which is capable of removing various undesirable contaminants in the exhaust gases. A great deal of research and experimental work has already been done in this field. Thus, there are known devices for exhaust gas decontamination, particularly usable with internal combustion engines, in which the exhaust gases are mixed with air and conducted through a catalyst in order to oxidize the combustible components of the gases. In the known devices, the air to be admixed is entrained by the exhaust gases in a jet pump or it is fed by means of a separate blower. In devices which use a jet pump, an exhaust main, which serves as an injection pipe, is mounted so as to lead into the jet apparatus aspiring the air. In both of the known constructions, however, the exhaust gas temperature is undesirably lowered by the admixed air and frequently, for example during the idle running of the internal combustion engine, the temperature of the exhaust gases will drop below the ignition temperature of the catalyst. That is why in automobiles, the catalytic combustion fails just during the periods, for example, when the automobile is used for reduced speed driving, such as going through a city or a town. It is in just such locations in which the decontamination of the exhaust gases is particularly desired.

There are also known devices in which the drawback of a low ignition temperature is remedied by heating the fresh air which is supplied to the exhaust gases which are treated. Such devices are very complicated, and their systems for supplying the fresh air which is heated are susceptible to disturbances. A further considerable shortcoming of the known devices is that the catalyst mass is renewable only by a major disassembly of the apparatus and by replacement of the catalyst mass. In some instances, the entire device must be replaced. Another disadvantage is that the devices produce a high counter-pressure on the gases so that the function of the injector to induce the flow of combustion air is either cut down or destroyed.

SUMMARY OF THE INVENTION

In accordance with the present invention, there is provided an apparatus for the catalytic purification of exhaust gases of internal combustion engines which comprises a compact structural unit of relatively short length which nevertheless has a high reaction efficiency and operates with low counterpressure on the exhaust gases and provides a system in which the entire flow of the exhaust gases come into contact with the catalyst mass. The invention provides a device which includes a housing having at least three separate chambers arranged one after the other and separated from each other by perforated partition walls. An injector or inspirator is mounted in the first chamber and comprises a pipe for the conduction of the exhaust gases which terminates at the inlet of the inspiration connection which begins in the first chamber and passes through the catalytic chamber and terminates in the last chamber. The introduction of the exhaust gases into the inspiration tube causes the induced flow of auxiliary air which is introduced into the housing. The auxiliary air mixes with the exhaust gases and provides the necessary air for further oxidation of the gases which are deflected after they pass through the diverging section of the aspirating tube for flow backwardly through the catalytic mass and then subsequently to be discharged. The catalytic mass is preferably a granular material which may be replenished in the device through a top loading section having a separate cover for the addition of the catalyst material.

The apparatus advantageously includes a double-walled housing so that the air which is to be admixed with the exhaust gases may be easily preheated by having it flow over the area which is traversed internally by the high temperature exhaust gases before it is directed into the space for inspiration into the inspiration tube. The arrangement is such that a very good thermic exploitation of the catalyst and, thereby, a particularly high efficiency, is obtained with the apparatus.

By providing a catalyst filling connection, a reserve space is provided for the accommodation of additional catalyst mass. This not only facilitates the filling of the catalyst mass, but also assures that a portion of the catalyst material will always be in a position at which it may be readily used for replacing the catalyst which is lost by abrasion.

In a preferred construction, the housing includes inner and outer jacket walls which are separated by spacer elements. At one of its ends, the jacket is closed by a wall provided with an aperture so that between this wall and the end wall of the end chamber, a relatively small size chamber is formed for the inflow of the combustion air. This inflowing air then flows in the annular space between the walls down to a pre-chamber directly before the first chamber, so that the combustion air is heated as it passes down to a point at which it is admitted for mixture with the exhaust gases.

The exhaust gases are advantageously admitted through a conduit which extends into the pre-chamber, so that this conduit portion of the exhaust conduit provides a heating area for the combustion air. The arrangement is such that the auxiliary combustion air which is needed for the catalytic combustion is conducted against the direction of flow of the exhaust gases so that the air is heated up gradually in counterflow heat transfer relationship. The construction helps to increase the reaction efficiency. In practice, it has been found useful to also surround the catalyst material inlet connection with an air flow space to provide it an additional inflow of auxiliary air which will mix with the air admitted to the inlet opening at the end chamber.

3

The first chamber which contains the pipe for the exhaust gas flow is also divided by a widened flanged inlet portion of the inspiration tube into a prechamber for the combustion air on one side and a chamber for the outlet flow of exhaust gases after they have passed through the catalytic material on the other side. A further useful embodiment of the invention is the provision of a short pipe which is located to extend through a horizontal section of the exhaust pipe directly before termination on the inlet of the inspiration tube. This forms an annular aperture with the exhaust tube in addition to the annular aperture formed between the exhaust tube and the inlet or entrance to the inspiration tube. The short pipe opens into the prechamber which is supplied with the combustion air which is then also aspirated by the flow of the exhaust gases into the inspiration tube. Thus a double injector is formed in a simple manner which also contributes to the higher efficiency of operation of the device because the suction effect of the exhaust gas jet is increased.

A further feature of the construction is that the space located downstream in the catalyst material chamber is shaped as a mixing and return space for the exhaust gas, and for auxiliary air which is aspirated through the injector, so that the gas to be purified is best prepared for the catalytic combustion prior to its entrance into the catalytic material.

Accordingly, it is an object of the invention to provide an improved device for purifying exhaust gases of internal combustion engines which comprises a housing divided up into a central or intermediate catalyst material chamber with an exhaust gas inflow chamber on one side and a gas deflection chamber at the opposite side and, wherein, an inspiration tube connects from the exhaust gas inlet chamber to the deflection chamber and an exhaust gas conduit is connected into the inlet of the inspiration tube, and wherein further, auxiliary combustion air is introduced into the device for inspiration into the inspiration tube along with the exhaust gases.

A further object of the invention is to provide a device for purifying exhaust gases of internal combustion engines which is simple in design, rugged in construction, and economical to manufacture.

The various features of novelty which characterize the invention are pointed out with particularity in the claims annexed to and forming a part of this disclosure. For a better understanding of the invention, its operating advantages and specific objects obtained by its uses, reference should be had to the accompanying drawings and descriptive matter in which there is illustrated a preferred embodiment of the invention.

GENERAL DESCRIPTION OF THE PREFERRED EMBODIMENT

Figure 1:
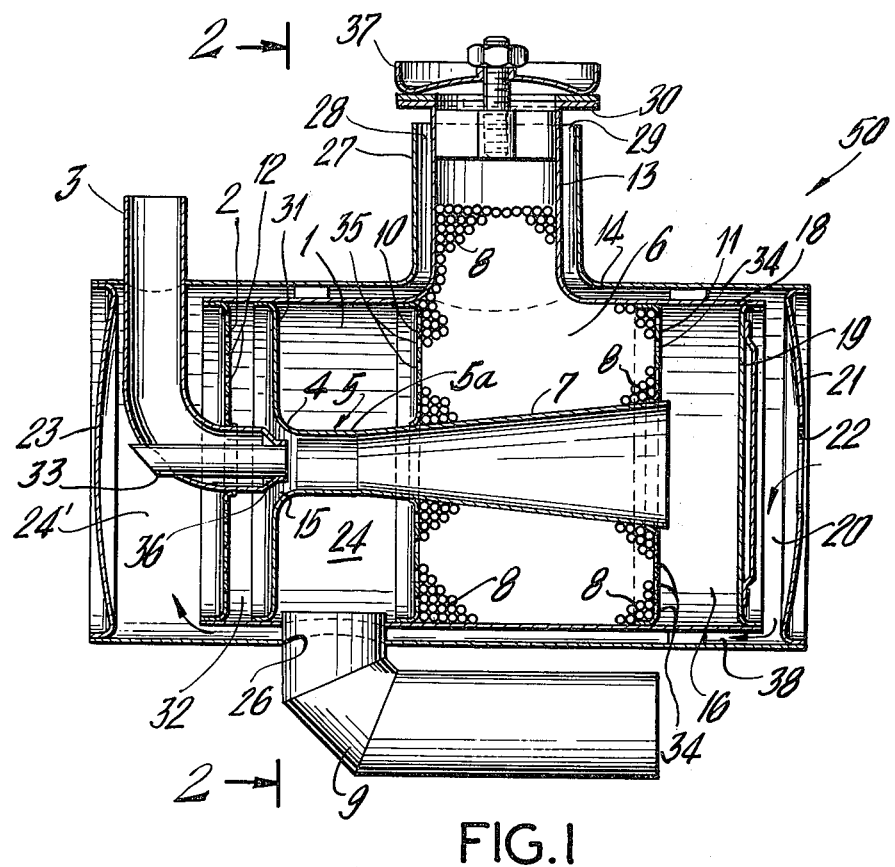
FIG. 1 is an axial sectional view of an apparatus for purifying exhaust gases, constructed in accordance with the invention.
Figure 2:
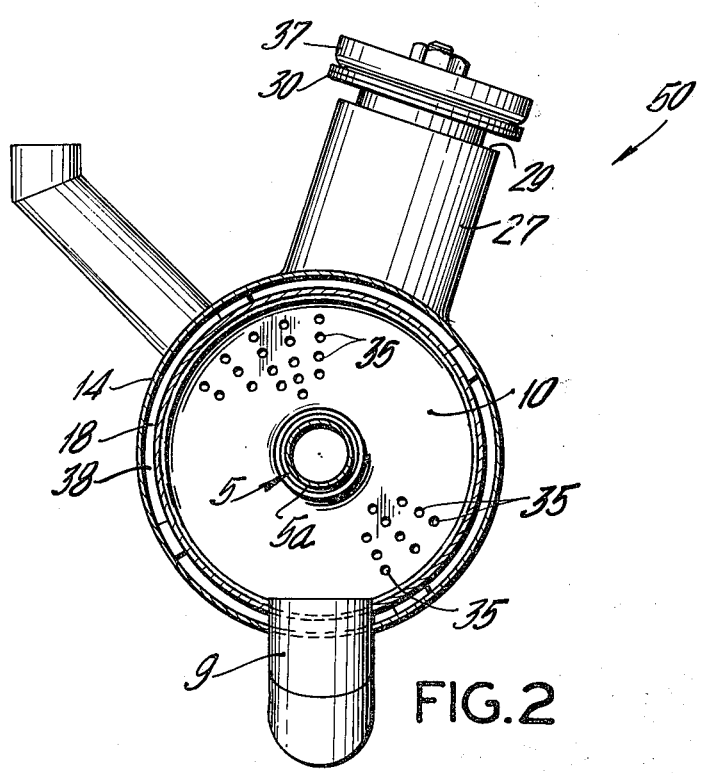
FIG. 2 is a section taken on the line 2—2 of FIG. 1.

Referring to the drawings in particular, the invention embodied therein, comprises a device for purifying exhaust gases of a combination chamber which comprises a housing, generally designated 50, having perforated partition walls 10 and 11, with perforations 35 and 34, respectively, which divide the interior of the housing into a first chamber 1, an intermediate chamber or catalytic material chamber 6, and an end chamber, or second chamber 16, for the reverse flow of combined exhaust gases and combination air.

In accordance with the invention, the exhaust gases to be purified are supplied through an exhaust gas pipe 3 which serves as an injector pipe and includes an orifice portion 36 which extends into an inlet portion 4 of an injector tube or aspiration tube 5. The aspiration tube 5 includes a narrow tube portion 5a and a divergent portion or diffusor 7, which extends through the catalytic material chamber 6 and terminates in a discharge in the chamber 16.

The first or inlet chamber 1 is divided into an exhaust gas discharge portion 24 which is connected to an exhaust conduit 9 for the lateral discharge of the purified exhaust gases, and to a combination air preheating chamber 24' by an outwardly flaring inlet portion 4 of the aspiration tube 5 which has curved outer walls 31 which engage an interior jacket wall 18 of the housing.

The exhaust gas supplied through the exhaust gas pipe 3 acts as a suction jet entraining the auxiliary air from the chamber 24', which is needed for the catalytic oxidation of the combustion components of the exhaust gas so that they move in through an inlet 15 defined around the exhaust conduit 3 at the location of the inlet 4 of the aspiration tube 5. In the diffusor of the injection tube, the flow rate is reduced, and the exhaust gases and air mixture passes into the chamber 16. The chamber serves to better intermix the two components of exhaust gas and auxiliary air, and to turn the current back by 180° for flow through the perforations 34 of the wall 11, through the catalytic material of the chamber 6. In the chamber 6, the exhaust gases and the combustion air are purified by oxidation of the combustible components. The purified exhaust gas is then passed through the openings 35 of the wall 10 and into the exhaust gas discharge portion 24 of the chamber 1 for exhaust through the exhaust gas discharge 9.

The catalyst mass 8 is preferably of a granulate material. During service, a certain abrasion of the catalyst mass cannot be avoided. The abrasive grit is removed by a gas stream and a corresponding quantity of catalyst must be replaced. For this purpose, a reserve connection or dome 13 extends outwardly from the chamber 6. The reserve dome 13 is provided with a flange 30, and it serves as a filler neck for the catalyst mass 8. The mass 8 is charged in such a quantity as to fill up the reserve dome 13 to approximately ¾ of its height. The dome 13 is closed by a cover 37. Any catalyst mass which is lost be abrasion is continuously supplied from the dome space 13. Thus, it is assured that during the whole life of device, the chamber 6 can be filled with the necessary quantity of catalyst.

As is known, a certain temperature is required for the catalytic combustion. The supplied exhaust gas will have this temperature. Measures must be taken for preventing the temperature from dropping inadmissibly by the admission of auxiliary air. In addition, the outer surface of the device, such as the jacket of the housing 50, must not become too hot in order not to endanger the vehicle. It has been proven that both of these requirements can be met by providing a second jacket surrounding the entire device located in spaced relationship to the inner wall 18, so that the casing includes an outer wall 14 so as to define a passage way or flow space 38 between the inner and outer walls. The jacket 14 extends beyond the wall 19 which closes the outer chamber or second chamber 16 on the one end, and also beyond a perforated wall 2, which is located between the wall 4 of the aspirator and an end wall 23. The far end is closed by a wall 21 having an opening 22 for the inflow of combustion air into an end chamber 20 for flow into the annular space 28.

The exhaust gas conduit 3 extends through the chamber 24' and through an aperture in the perforated wall 2.

The air which flows in through the inlet opening 22 and through the annular space 38 is aspirated by the injector and mixed with the exhaust gases which are both conducted through the diffusor 7 to the redirecting chamber 16. The combined gases flow through the catalyst mass 8 and are evacuated through the exhaust outlet connection 9 which is secured in the opening 26 of the jacket 14. When the auxiliary air moves through the annular space 38, it is preheated and, at the same time, it forms an effective insulation between the inner and outer walls of the housing 50. In order to increase the supply of auxiliary air, the reserve dome 13 is also surrounded by a jacket 27 so that an annular space 28 is formed, having an opening 29 for the inflow of additional air which faces the flange 30 of the dome 13. The auxiliary air penetrating through the opening 29 mixes with the auxiliary air conducted through the annular space 18.

Another improvement of the invention is the radial extension of the inlet portion 4 in the shape of a wall or partition 31 which forms a chamber 32 between it and the wall 2. The wall 2 has openings 12, and the auxiliary air is aspirated through these openings into the chamber 32 due to the action of the flowing exhaust gases which enter into the inlet 4 of the aspirating tube 5.

A short pipe 33 extends through the horizontal portion of the exhaust conduit 3 and it is bevelled at its outer end which protrudes into the chamber 24' and its opposite end terminates in the plane of the orifice 36 of the conduit 3. Thus, a double action injector is created in which the exhaust gas flowing through the pipe 3 serves as a working fluid and aspirates the auxiliary air through the short pipe 33 as well as through the openings 12 and the chamber 32.

The device, in accordance with the invention, may be made very compact and of relatively short dimensions, and is suitable for the decontamination of exhaust gases of internal combustion engines, such as those found in automobiles. It is distinguished by the fact that it is capable of having a very long life and to operate at high efficiency during its entire lifetime.

While a specific embodiment of the invention has been shown and described in detail to illustrate the application of the principles of the invention, it will be understood that the invention may be embodied otherwise without departing from such principles.

What is claimed is:

1. An apparatus for purifying exhaust gases, comprising a housing having an intermediate catalytic material chamber with a first chamber and a second mixing and reversing chamber on respective sides thereof, first and second perforated partitions in said housing on each side of said catalytic material chamber dividing said intermediate chamber from said first and second chambers but permitting the flow of gases therethrough, an aspiration tube having an inlet located in said first chamber and extending through said catalytic material chamber into said second chamber for the flow of exhaust gases from said first chamber into said second chamber, an exhaust gas delivery pipe connected into said first chamber and having a discharge terminating adjacent said aspiration tube inlet leaving a combustion air flow space between said exhaust gas delivery pipe and said aspiration tube for the inflow of air along with the exhaust gases, means to deflect the exhaust gases and air backwardly from said second chamber back through said catalytic chamber for treatment in said catalytic chamber and for flow to said first chamber, a gas discharge in said first chamber for the discharge of the treated exhaust gases, wall means connected to said aspiration tube inlet and dividing said first chamber into an exhaust chamber which is adjacent said intermediate chamber and connected to said gas discharge, a third perforated partition spaced from said wall means, an inlet chamber located between said third perforated partition and said wall means, and combustion air supply means to supply combustion air through said third perforated partition into said inlet chamber, said exhaust gases in their passage from said exhaust gas delivery pipe into said aspiration tube inlet being cooled by the combustion air and acting to draw the combustion air into said inlet and through said aspiration tube for flow therethrough and into said second mixing and reversing chamber and then backwardly through said catalytic material chamber.

2. An apparatus for purifying exhaust gases, according to claim 1, including a reserve connection for catalytic material connecting into said catalytic material chamber, said reverse connection forming a filler neck for the catalyst mass.

3. An apparatus for purifying exhaust gases, according to claim 1, wherein said housing includes an extension connected into said catalytic material chamber forming a reserve supply dome for the catalyst material, said housing being of double-wall construction around said supply dome and said housing being of double-wall construction to define an annular space around said chambers which communicates with the annular space of said dome, said housing having an inlet for combustion air into the annular space adjacent said second chamber, said dome also having an inlet for combustion air adjacent the top of said dome, the combustion air communicating with the inlet of said aspiration tube.

4. An apparatus for purifying exhaust gases, according to claim 1, wherein said exhaust gas pipe includes a horizontal portion, and a short pipe of a smaller diameter than said horizontal portion of said exhaust pipe extending through said exhaust pipe and terminating with the discharge in the plane of the discharge of the exhaust pipe on one end and having an opposite end extending into said inlet chamber, said short pipe also defining a passage for the combustion air.

5. An apparatus for purifying exhaust gases according to claim 1, wherein said housing includes inner and outer walls forming an annular space therebetween communicating with said combustion air flow space, and an inlet opening connected to said annular space for the inflow of combustion air.

* * * * *